United States Patent Office 2,814,579
Patented Nov. 26, 1957

2,814,579

ARC-WELDING COMPOSITIONS

Leonidas K. Stringham, Shaker Heights, and Paul E. Jerabek, Euclid, Ohio, assignors to The Lincoln Electric Company, Cleveland, Ohio, a corporation of Ohio No Drawing. Application July 20, 1953, Serial No. 369,213

3 Claims. (Cl. 148—26)

The present application is a continuation in part of our copending Patent 2,719,801, dated October 4, 1955, Serial No. 245,258 filed September 5, 1951, and, as in that patent, the invention pertains to a flux composition for use in electric arc welding and, more particularly, to flux compositions of the granular type designed to be used in what has now become known as concealed arc welding.

In the art of concealed arc welding, a pile or windrow of granular flux material of special chemical composition is deposited on the seam to be welded. A wire electrode, electrically energized relative to the workpiece, is advanced through this pile of flux material to engage the workpiece and start an electric arc therewith. This arc melts away the electrode which is then continuously advanced toward the workpiece at a rate equal to the melt-off rate to deposit molten weld metal on the weld seam. As the seam is welded, the electrode is moved sideways along the seam, through the pile of flux to provide a continuous seam weld. Some or all of the granular flux material fuses in the presence of the heat of the arc and, being lighter than the weld metal, floats on top of the molten weld metal to protect it from the detrimental effects of the surrounding atmosphere.

This molten flux is in intimate contact with the molten weld metal at a time when both are heated to highly elevated temperatures and both are thus chemically active. There has generally always been a tendency for certain of the constituents of the molten flux to enter into and form an alloy with the molten weld metal and, in a like manner, there has been a tendency for certain elements of the molten weld metal to enter into the molten flux. In many instances, this interchange of elements or compounds between the two molten materials is considered quite desirable and results in an improved weld. On the other hand, the interchange of materials can remove certain desirable elements from or added certain undesirable elements to the molten weld metal resulting in an inferior weld.

Until recently, preformed or prefused silicate compounds, such as the manganese silicate disclosed in Patent No. 1,754,566 to W. B. Miller dated April 15, 1930, have been found most satisfactory for the purpose indicated. While this patent also suggests that instead of preformed manganese silicate, a welding composition containing material adapted to react at the temperature of the metal-depositing operation to produce manganese silicate, such as a simple intermixture of the ingredients, particularly where certain desirable additives are included, has never been found satisfactory in use.

There has more recently been perfected an improved flux composition as disclosed in Patent No. 2,474,787 to G. G. Landis et al. dated June 28, 1949, and assigned to the assignee of this application, in which the flux ingredients consist essentially of one or more metallic oxides and silica in an amount approximately that required to combine with such oxides to form the corresponding silicates. These ingredients are finely ground, thoroughly intermixed and then agglomerated in uniformly distributed condition throughout by means of a suitable binder, such as anhydrous water glass. The agglomerated ingredients are in the form of granular free-flowing particles which are used as above described. The advantages of employing such an agglomerated flux together with other essential ingredients of the composition in uncombined or unreacted form, instead of prefusing such ingredients so as to complete all reaction therebetween before use in welding, are fully pointed out in this last referred to patent.

All of such prior granular fluxes have generally had one thing in common; namely, the element silicon in substantial amount, either in the form of silicon dioxide or in the form of a silicate. In these prior fluxes, it has been found that there is a tendency for the silicon to be interchanged between the molten flux and the molten weld metal with a resulting detrimental embrittlement of the weld metal which, in many instances, cannot be tolerated. This is particularly true with high sulphur steels. Also, the problem of silicon addition to the steel is worse with agglomerated fluxes of the type to which this invention pertains than with prefused fluxes.

The present invention contemplates and has for its principal objects a flux composition which has either no or a minimum of silicon, either in elemental or combined form, which is cheap and easily produced and which enables a superior weld to be obtained under adverse conditions.

In accordance with the present invention, a flux is provided, made up principally of a plurality of unreacted ingredients, including, in combination, a base ingredient and an acid ingredient, the acid ingredient being such that either a titanate, aluminate or zirconate salt will principally be formed, when the unreacted ingredients melt and react in the presence of the heat of the welding arc, the particular salt produced depending upon the nature of the acid ingredient employed. The ingredients employed will generally be oxides of the various metals; such as, without limitation, the oxides of the alkaline earth metals, manganese, aluminum, titanium or zirconium. The words "acid" and "base" are used in relation to the ability of the oxides of these various metals to react one with the other in the heat of the arc to form a salt of one of them, usually the more acid of the two. Thus, manganese oxide reacts with titanium oxide to form manganese titanate. Normally, the oxides of the alkaline earth metals or manganese are considered basic while the oxides of aluminum, titanium, silicon and zirconium are acid. The oxide of aluminum however can be either acidic or basic.

These acid and base ingredients are used in the flux in such proportions that the final reacted and fused flux will be essentially neutral in nature; that is to say, it will neither have acid nor base characteristics. If variations from this neutral characteristic are to be had, they should be on the side of having the final reacted flux basic rather than acid. If the reacted flux is too acid, then it has been found that the fluxing material has too high a solidifying temperature and does not possess the wetting characteristics, either for the molten metal or the heated metal alongside of the weld, which is desired. It will be appreciated that if the reaction product obtained has too high a solidifying temperature, there is danger that the flux will solidify before the deposited weld metal, thus resulting in an unsatisfactory appearance of the final weld bead.

The base ingredients of the present invention are selected principally from the class consisting of the oxides of the alkaline earth metals or manganese or the equivalents thereof. Iron oxide should not be used unless it is present only in small insignificant amounts. The acid ingredients, in accordance with the invention, are principally selected from the class consisting of the oxides of aluminum, titanium or zirconium or the equivalent thereof, such as compounds which will form such oxides upon decomposition and react with the base ingredients referred to above to produce salts of the respective acid ingredient, whichever has been selected.

It is to be noted that an important part of the present invention is the realization that the above-named acid ingredients can be either basic or acid, depending upon the nature of the reacting ingredient. Thus, if these acid ingredients were mixed with silicon dioxide, they will then act as basic ingredients, reacting with the silicon dioxide to form a silicate salt, or, if silicon dioxide is present when both the base and acid ingredients above referred to are in the mixture, the silicon dioxide will react with both the basic and acid ingredients to form a silicate as well as the salt of the particular acid ingredient involved. Thus, the invention does not rule out aluminum oxide as a basic ingredient when it is mixed with a more acid ingredient such as the titanium dioxide or zirconium oxide.

The invention also contemplates the use of minor amounts of a killing agent or deoxidizer; such as, silicomanganese, ferromanganese or ferrosilicon, or similar alloys such killing agents being present in amounts of between 3 to 7 percent, more or less.

The invention also contemplates the use of inorganic halogen salts in minor proportions; for example, in amounts from 2.5 to 10 percent more or less, such salts being selected from the class of calcium fluoride, sodium fluoride or potassium fluoride or the equivalent thereof.

The invention does not exclude the presence of other elements or ingredients in minor amounts, so long as the elements above referred to, and particularly, the combined basic and acid ingredients are present in substantial amounts of up to at least 75 percent.

In accordance with the invention, the selected ingredients must be finely ground or pulverized, then thoroughly mixed and bound together by suitable means, the entire mass then being broken into a plurality of relatively small free-flowing granules, the individual ingredients being uniformly distributed through each granule. Usually, a binder; such as, sodium silicate, potassium silicate or the like, will be used for the purpose of binding the ingredients together, the entire mixture being heated after these binders have been added to first drive off all the water and then to partially fuse the binder material so as to securely bind all of the fine ingredients upon cooling into firm, relatively hard granules which are not easily broken up during shipment or use.

As previously stated, the acid and basic ingredients are preferably combined in such proportions so that the fused reaction product will be generally neutral relative to the molten steel of the deposited weld metal. It will be appreciated that the zirconium oxide is more acid than the titanium dioxide which, in turn, is more acid than the aluminum oxide. Thus, for a given satisfactory flux, such as one using only zirconium oxide as the acid ingredient, if aluminum oxide is to be substituted therefor, proportionately greater amounts will be required if a neutral reaction product is to be obtained. This is readily illustrated by the fact that with zirconium and with manganese ore of 75 percent manganese oxides, approximately twice as much manganese ore by weight will be required over the zirconium oxide. However, if aluminum oxide is used instead, then approximately one and one-half times as much aluminum oxide will be required as the manganese ore. With the titanium dioxide, approximately equal amounts of manganese ore and titanium dioxide should be employed.

The invention may be broadly defined as a flux composition made up of a plurality of ingredients comprising, in combination: a base ingredient selected principally from the class of the oxides of the alkaline earth metals and manganese; an acid ingredient selected principally from the class consisting of the oxides of aluminum, titanium, zirconium and aluminate, titanate and zirconate-forming compounds; plus minor amounts of an inorganic halogen salt and a killing agent, both in relatively minor amounts, all of the above ingredients being finely ground and agglomerated in uniformly dispersed condition in free-flowing granules adapted to be deposited upon a weld seam. The following will indicate generally the ingredients and the preferred range thereof which may be used in making up our present improved arc-welding composition:

| | Percent |
|---|---|
| Base ingredients | 20–70 |
| Acid ingredients | 65–23 |
| Halogen salts | 2.5–10 |
| Killing agent | 1.5–10 |
| Binder | 0–18 |

More specifically, the following general ranges in percent have been found satisfactory in actual welding practice:

TYPE

| | Titanate | Zirconate | Aluminate |
|---|---|---|---|
| MgO CaO | [26–0] [20–58] | [23–0] [35–70] | [33–0] [13–45] |
| Mn ore (75% MnO) | | | |
| TiO₂ | 52–30 | | |
| ZrO₂ | | 35–23 | 0–25 |
| SiO₂ | | | |
| Al₂O₃ | 0–5 | 0–5 | 63–25 |
| Fluorspar | 2.5–10 | 2.5–10 | 2.5–10 |
| Killing agent such as 50% FeSi | 1.5–10 | 1.5–10 | 1.5–10 |

More specifically, the following specific formulations have been found satisfactory in practice:

*Example 1*

| | Percent |
|---|---|
| Mn ore (75% MnO) | 40 |
| TiO₂ | 36 |
| CaF₂ | 3.5 |
| FeSi | 4 |
| Binder (43% solid sodium silicate) | 16.5 |

*Example 2*

| | |
|---|---|
| Mn ore (75% MnO) | 22 |
| MgO | 14 |
| TiO₂ | 34.5 |
| Al₂O₃ | 5 |
| CaF₂ | 4 |
| FeSi | 3.5 |
| Binder (43% solid sodium silicate) | 15 |

*Example 3*

| | |
|---|---|
| Mn ore (75% MnO) | 49.5 |
| ZrO₂ | 25 |
| CaF₂ | 4 |
| FeSi | 4.5 |
| Binder (43% solid sodium silicate) | 17 |

*Example 4*

| | |
|---|---|
| Mn ore (75% MnO) | 34 |
| MgO | 12 |
| ZrO₂ | 25 |
| Al₂O₃ | 5 |
| CaF₂ | 4 |
| FeSi | 4 |
| Binder (43% solid sodium silicate) | 16 |

*Example 5*

| | |
|---|---|
| Mn ore (75% MnO) | 28 |
| Zircon | 14.5 |
| Al₂O₃ | 37 |
| CaF₂ | 3.5 |
| FeSi | 3.5 |
| Binder (43% solid sodium silicate) | 12.5 |

Example 6

| | |
|---|---|
| Mn ore (75% MnO) | 21 |
| MgO | 6 |
| FeO.TiO₂ (ilmenite) | 4.5 |
| ZrSiO₄ (zircon) | 5 |
| SiO₂ | 5 |
| Al₂O₃ | 36 |
| CaF₂ | 3.5 |
| FeSi | 6 |
| Binder (43% solid sodium silicate) | 13 |

Example 7

| | |
|---|---|
| Mn ore (75% MnO) | 23 |
| ZrO₂ | 8 |
| SiO₂ | 3 |
| Al₂O₃ | 43 |
| CaF₂ | 3 |
| FeSi | 3.5 |
| Binder (43% solid sodium silicate) | 16.5 |

In this formulation, SiO₂ could be readily eliminated and is included only because it comes as an impurity in zirkite, a relatively inexpensive ore as compared to pure ZrO₂.

Referring to the foregoing tables, it should be explained that the term "manganese ore" is intended to connote not merely the several forms of manganese oxide which are available in the form of a naturally occuring mineral, but also various forms of manganese oxide which are obtained as the result of processing other ores. Also, while in said tables, the formula MnO is employed to indicate the chief component of such ore. It will be understood that the latter may consist to a greater or less extent of other oxides of manganese. Of course, where the ore used is a naturally occurring mineral, depending upon the degree of refinement thereof, it will always contain certain impurities in minor amount; e. g., silica, pyrite or alumina, either in free or combined form.

In preparing our improved flux composition using any of the foregoing formulas, all of the ingredients, with the exception of the sodium silicate, are employed in dry finely ground state and are thoroughly intermixed either before or incidentally to the addition of the sodium silicate solution. Thereupon, the whole is dried at a suitable temperature to a point where the water content is reduced to ½% or less, following which the resulting agglomerated mass is crushed to approximately 12 x 120 mesh.

The temperature employed in thus driving off the water may vary, with a corresponding variation in the time factor, so long as it is held substantially below that at which any appreciable interfusion of the ingredients will occur. In other words, no attempt is made to sinter the entire mixture, much less to form a synthetic compound of the components, but merely to bind together the fine particles comprising the mixture into uniform conglomerate mixture, in which the dried sodium silicate serves as the binding agent. It will be understood that potassium silicate may be utilized equally well as a binder, and it, together with such sodium silicate, are inclusively designated herein by the term "water glass." A temperature of from 1400° F. to 1600° F. has been found a satisfactory one to which to heat the mixture, where, as preferred, such heating is carried out in a rotary kiln. By properly regulating the rate of flow of the material through the kiln, the drying operation will proceed gradually and at a sufficiently rapid rate for commercial production. Furthermore, by drying the material in such rotary kiln, it has been found that a substantial proportion thereof will be discharged already in granular form of desired particle size and, thus, reduce the amount of the material which will need to be crushed to obtain such particle size. While some of the particles will be too fine for satisfactory use as a welding composition, these can be screened out and agglomerated into large particles by passing the same through the kiln a second time.

An indicated in the examples given above, the manganese oxide employed will ordinarily be manganese ore either in the form of the naturally occurring mineral or such mineral which has been processed as by roasting in order to reduce the available oxygen and otherwise condition such ore for its intended use.

Where magnesia is listed as one of the ingredients, it will be understood that in commercial manufacture what is employed will ordinarily be burnt magnesite, the magnesia (MgO) content of which is somewhat less than 100% and this may make desirable a corresponding slight modification in the proportion used.

It will be understood that in the dried, finished product, the agglomerated particles will contain the ingredients listed in the several examples given above in slightly different proportion owing to the elimination of the water content introduced in the form of the sodium silicate binder. However, the percentage of such ingredients can be readily determined by calculation. In this connection, it should be explained that in place of using such water glass as the binder, either anhydrous sodium silicate, sodium hydroxide or sodium carbonate may be substituted; in which latter case, there should be sufficient free silica present to react with such hydroxide or carbonate to form sodium silicate in situ when the mixture is heated. In order to effect such reaction, it may be necessary to employ a somewhat higher temperature; e. g., approximately 1800° F., instead of the temperature range given above for drying the mixture where water glass is used as the binder. However, in all cases, the amount of the binder in the final product should be the minimum required to agglomerate the flux ingredients proper in uniformly distributed condition in the particles.

In all the above referred to examples, the binder has been anhydrous sodium silicate which binds the ingredients easily and at relatively low temperatures. Obviously, any other binder could be employed or the binder could be entirely eliminated, the finely ground ingredients then being heated to the temperature of incipient fusion of the lowest melting point ingredient which then serves as a binder for the remaining ingredients.

It is important from the standpoint of the invention that the ingredients be agglomerated in uniformly distributed condition throughout each particle and it is particularly important that the remaining ingredients are in the unreacted state. The invention specifically excludes reacted ingredients and unagglomerated ingredients.

The fluxes as above defined have proven quite satisfactory in weld tests. They do not contaminate the weld metal. They have a lower solidifying point than does molten steel. They are neutral. They set up or harden rapidly after the steel has solidified. They remove easily from the weld.

We claim:

1. A flux composition for use in arc welding of steels and the like consisting of a plurality of flux ingredients in approximately the following proportions:

| | Percent |
|---|---|
| Mn ore (75% MnO) | 49.5 |
| ZrO₂ | 25 |
| CaF₂ | 4 |
| FeSi | 4.5 |
| Binder (43% solid sodium silicate) | 17 | all of said ingredients being finely ground, thoroughly intermixed and bound together in the unreacted state into free-flowing granular flux particles.

2. An arc welding flux of the type to be deposited on a seam to be welded and to have an arc maintained thereunder between a continuously fed electrode and a workpiece, said flux consisting essentially of the following named ingredients; namely, a base ingredient selected from the class of the alkaline earth metal oxides and manganese oxide in amounts of from 20 to 58 percent, an acid ingredient in the form of an oxide of titanium in amounts of from 52 to 30 percent, halogen salts selected from the class of calcium fluoride, sodium fluoride and potassium fluoride in amounts of from 2.5 to 10 percent, a killing agent selected from the class of silico manganese, ferro manganese and ferro silicon in amounts of from 1.5 to 10 percent, all of such ingredients being finely ground, thoroughly mixed and bound together in the unreacted state into granules having a free-flowing characteristic by a binder selected from the class consisting of sodium and potassium silicate.

3. An arc welding flux of the type to be deposited on a seam to be welded and to have an arc maintained thereunder between a continuously fed electrode and a workpiece, said flux consisting essentially of the following named ingredients; namely, a base ingredient selected from the class of the alkaline earth metal oxides and manganese oxide in amounts of from 35 to 70 percent, an acid ingredient in the form of an oxide of zirconium in amounts of from 35 to 23 percent, halogen salts selected from the class of calcium fluoride, sodium fluoride and potassium fluoride in amounts of from 2.5 to 10 percent, a killing agent selected from the class of silico manganese, ferro manganese and ferro silicon in amounts of from 1.5 to 10 percent, all of such ingredients being finely ground, thoroughly mixed and bound together in the unreacted state into granules having a free-flowing characteristic by a binder selected from the class consisting of sodium and potassium silicate.

References Cited in the file of this patent

UNITED STATES PATENTS

| | | |
|---|---|---|
| 1,956,327 | Jerabek | Apr. 24, 1934 |
| 2,043,960 | Jones et al. | June 6, 1936 |
| 2,150,925 | Johnston | Mar. 21, 1939 |
| 2,194,200 | Cohn | Mar. 19, 1940 |
| 2,308,194 | Miller | Jan. 12, 1943 |
| 2,435,852 | Stringham | Feb. 10, 1948 |
| 2,474,787 | Landis et al. | June 28, 1949 |
| 2,547,432 | Andrews et al. | Apr. 3, 1951 |